United States Patent [19]

Bol

[11] Patent Number: 5,248,379

[45] Date of Patent: * Sep. 28, 1993

[54] METHOD TO MANUFACTURE LENSES, OPTICAL SYSTEMS AND FOCUSING MIRRORS BY MICROMACHINING

[75] Inventor: Igor I. Bol, Sherman Oaks, Calif.

[73] Assignee: Xerox Corporation, Stamford, Conn.

[ * ] Notice: The portion of the term of this patent subsequent to Sep. 22, 2009 has been disclaimed.

[21] Appl. No.: 817,163

[22] Filed: Jan. 6, 1992

[51] Int. Cl.$^5$ ............... H01L 21/306; B44C 1/22; C03C 15/00; C03C 25/06

[52] U.S. Cl. .................. 156/628; 156/657; 156/662; 437/238

[58] Field of Search ............. 156/628, 653, 656, 659.1, 156/657, 661.1, 662; 437/228, 233, 238, 241, 245

[56] References Cited

U.S. PATENT DOCUMENTS 5,149,397  9/1992  Bol ................................ 156/656 X

*Primary Examiner*—William A. Powell

*Attorney, Agent, or Firm*—Nola Mae McBain

[57] ABSTRACT

A process for making a micromechanical generally bowl shaped or round shaped element upon a substrate by providing a member having a generally planar surface and walls extending from the surface Bumpers are then grown into the walls. The generally round shaped oxide bumpers form a generally bowl shaped convexo-concave relationship with the walls. The walls are covered on their outer periphery with a material which is resistant to the growth of the bumpers to control the growth of the bumpers at the periphery of the walls as the bumper is grown into the walls. The final step is removing either the bumpers from the walls or removing the walls from the bumpers leaving either a generally bowl shaped element or a round shaped element respectively on the substrate. In addition the walls may be implanted with a dopant to further control the shape of the bumper. When the generally bowl shaped element is made from silicon, it can be utilized as an optical mirror. When the generally round shaped element is made from silicon dioxide it can be utilized as a lens.

32 Claims, 4 Drawing Sheets

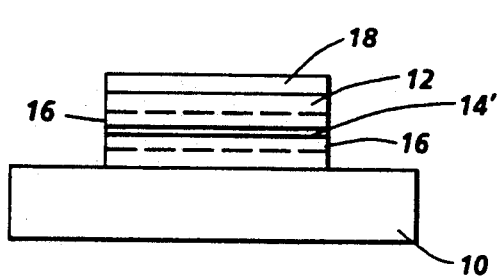
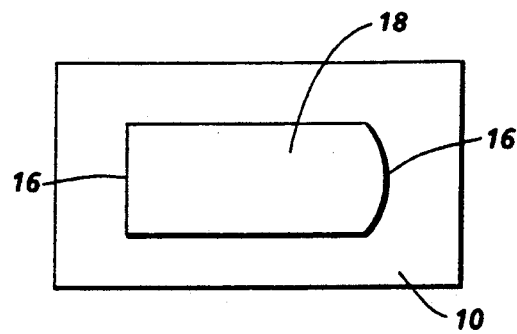
FIG. 7  FIG. 8
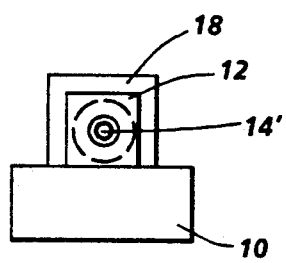
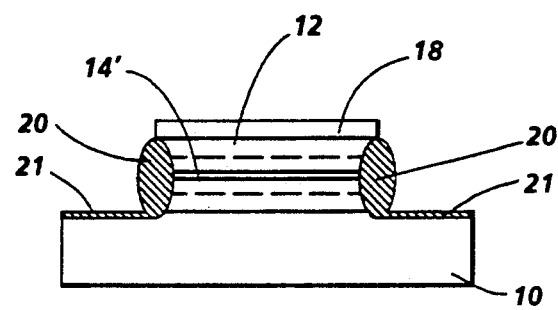
FIG. 9  FIG. 10
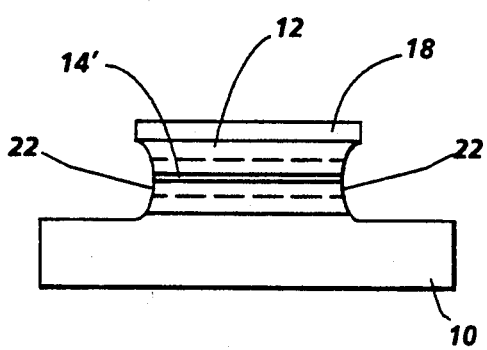
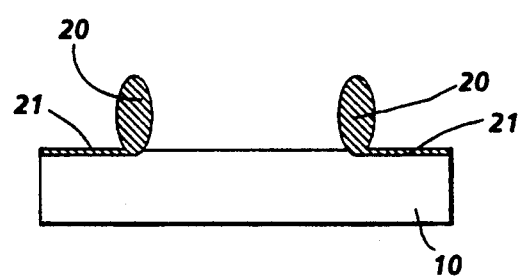
FIG. 11  FIG. 12

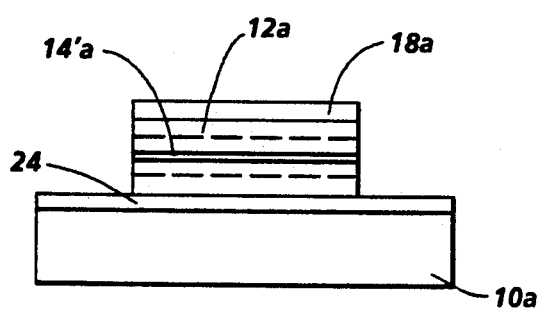
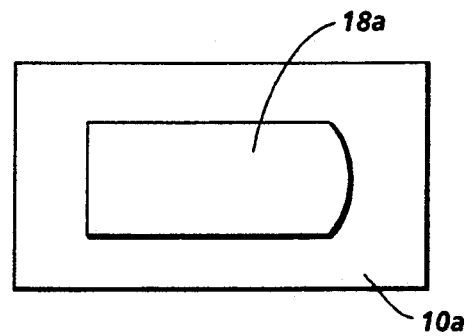
FIG. 18   FIG. 19
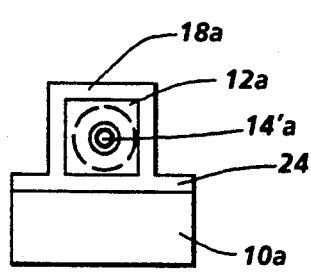
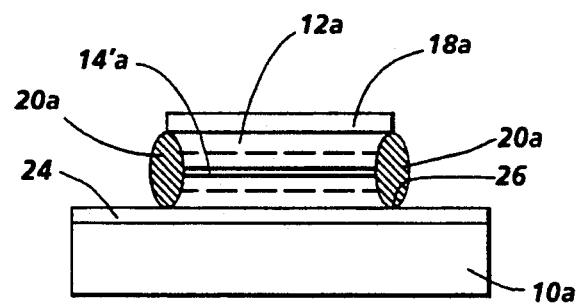
FIG. 20   FIG. 21
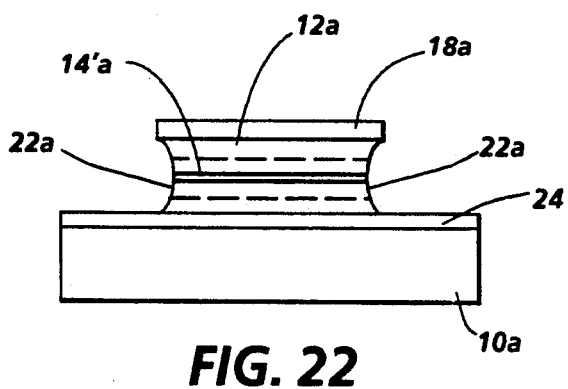
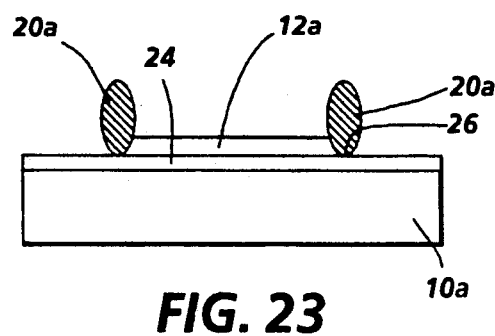
FIG. 22   FIG. 23

ME THOD TO MANUFACTURE LENSES, OPTICAL SYSTEMS AND FOCUSING MIRRORS BY MICROMACHINING

This application is related to applicant's copending U.S. applications Ser. No. 07/725,174, U.S. Pat. No. 5,149,397, Fabrication Methods for Micromechanical Elements, Ser. No. 07/725,176, U.S. Pat. No. 5,151,153, Manufacture of a Suspended Micromechanical Element, and Ser. No. 07/725,173, U.S. Pat. No. 5,209,818, Manufacture of a Micromechanical Element with Two Degrees of Freedom, all filed Jul. 3, 1991.

SUMMARY OF THE INVENTION

Briefly stated and in accordance with the present invention, there is provided a process for making smooth curves in silicon and application of that process to making lenses, optical systems and focusing mirrors.

A smooth three dimensional curve is made using a two step patterning process. The first step is to define the edge or wall of a silicon block, on a substrate, to be curved using conventional photoresist and etching techniques. The second step is to grow a bumper into the edge or wall to be curved, the bumper forming a three dimensional bowl shaped relationship with the edge or wall. The bumper will bulge outward into the edge of the wall and the edge or wall will bulge inward to accommodate the bumper. The conclusion of this step is removal of the bumper while the edge or wall retains its bowl shape to produce a mirror or removal of the block leaving the curved bumper to produce a lens.

Brief Description of the Drawings

FIG. 7 is a side view after patterning of FIG. 6;

FIG. 8 is a top view of FIG. 7;

FIG. 9 is a end view of FIG. 7;

FIG. 10 is a side view of FIG. 7 after oxide bumper growth;

FIG. 11 is a side view of a mirror produced from the steps shown in FIGS. 1-10;

FIG. 12 is a side view of a pair of lenses produced from the steps shown in FIGS. 1-10;

FIG. 18 is a side view after patterning of FIG. 17;

FIG. 19 is a top view of FIG. 18;

FIG. 20 is a plan view of FIG. 18

FIG. 21 is a side view of FIG. 18 after oxide bumper growth;

FIG. 22 is a side view of a mirror produced from the steps shown in FIGS. 13-21; and FIG. 23 is a side view of a pair of lenses produced from the steps shown in FIGS. 13-21.

| Numbered List of Elements | |
|---|---|
| substrate | 10 |
| structural layer | 12 |
| masking layer | 13 |
| ion implantation | 14 |
| concentration gradient | 14' |
| ends | 16 |
| silicon nitride | 18 |
| oxide bumpers | 20 |
| oxide | 21 |
| mirror | 22 |
| lenses | 20 |
| nitride layer | 24 |
| base of oxide bumper | 26 |

DESCRIPTION OF THE INVENTION

Figure 1:
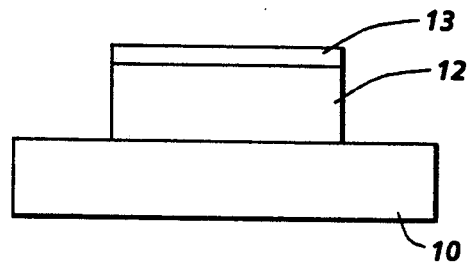
FIG. 1 is a side view of a substrate with a deposited and patterned structural layer and a deposited and patterned masking layer.
Figure 2:
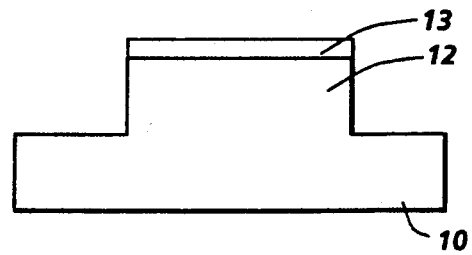
FIG. 2 is a side view of a substrate with an etched structural and masking layer.

FIG. 1 illustrates a substrate 10 after depositing and forming a structural layer 12 and a masking layer 13. In this embodiment, silicon is used for the substrate. Silicon is ideal since it is not damaged during high temperature process steps. Other materials, such as ceramics could be substituted. Conventional steps of photoresist and etching can be used to form the structural layer 12 from either a deposited layer of silicon on a non-silicon substrate or to create a protrusion from a silicon substrate as shown in FIG. 2. The masking layer is used during a later process step of ion implantation. For low energy ion implantation a conventional mask of photoresist may be used. For high energy ion implantation a thin layer of metal approximately 0.2 microns thick is used for the masking layer 13.

Figure 3:
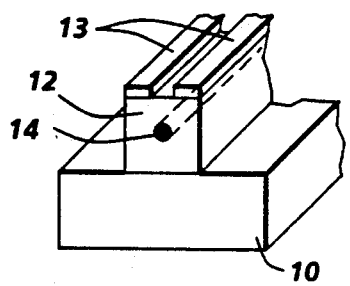
FIG. 3 is a plan view of FIG. 2 after patterning a slit in the masking layer and ion implantation.

As shown in FIG. 3, the masking layer is patterned in a slit. If the masking layer is photoresist, conventional techniques may be used. If the masking layer is metal the slit is patterned using a well known process utilizing thin photoresist to achieve fine metal patterning. Once the masking layer 13 is patterned then ion implantation 14 of a dopant of phosphorus, arsenic or boron into the structural layer 12 at a concentration in the range of approximately $10^{14}$ to $10^{16}$ atoms per cubic centimeter at an energy sufficient to place the dopant in the center of the structural layer 12 done using a conventional ion implantation process (see FIG. 3). The purpose of implanting phosphorus, arsenic or boron into the structural layer 12 is to control the oxidation rate of the structural layer 12 in a later process step. Where the concentration is greatest, the structural layer 12 will oxidize the fastest. Where the concentration is least, the structural layer 12 will oxidize slowest.

Figure 4:
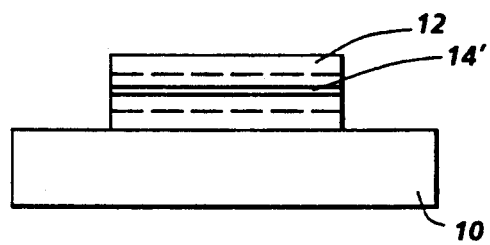
FIG. 4 is a side view of FIG. 3 after diffusion.
Figure 5:
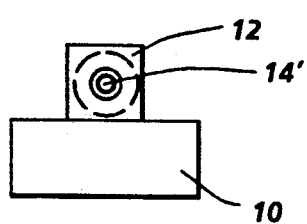
FIG. 5 is an end view of FIG. 4.

The masking layer 13 is then stripped and the dopant is then diffused to form a concentration gradient 14' throughout the structural layer as shown in FIG. 4. An end view of the structural layer showing the concentration gradient 14' is shown in FIG. 5. Due to implantation masking and the diffusion process this concentration gradient 14' is a series of concentric circles. The concentration of the dopant is heaviest in the center where the lines or circles are closest together.

Figure 6:
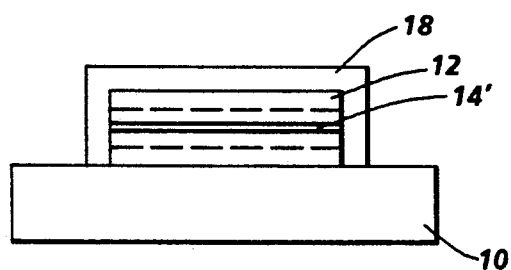
FIG. 6 is a side view of FIG. 4 after silicon nitride deposition.

The structural layer 12 is then covered with a layer of silicon nitride 18 ($SiN_3$) using conventional nitride deposition techniques as shown in FIG. 6. The nitride completely covers the structural layer and must be patterned to facilitate the next phase. The silicon nitride 18 interface with the structural layer 12 will also help to control the oxidation rate of the structural layer 12 in a subsequent step. Silicon nitride is resistant to the growth of oxide bumpers because oxygen will be unable to attack the structural layer 12 where it is covered with silicon nitride 18. At the interface of the structural layer 12 and the silicon nitride, 18, the oxidation rates of the structural layer 12 will be slower since oxygen is partially blocked from the structural layer 12. Conventional photoresist and etching techniques are used in the patterning step to remove the nitride from the ends 16 of the structural layer 12 and to pattern the bare ends 16 of the structural layer 12 as shown in FIG. 7. The bare ends 16 may be patterned flat or into a curve depending on the shape of the lens or mirror desired as shown in FIG. 8. When this phase is completed, the remaining structural layer 12 will project or protrude from the surface of the substrate 10. A cross-section of the structural layer in FIG. 9 shows the protruding structural layer 12 covered on three sides by silicon nitride 18 and the concentration gradient 14' inside the structural layer 12. The projecting or protruding remains of the structural layer 12 will later become a mirror 22 or be used to shape a lens 20 as shown in FIGS. 11 and 12.

The second patterning phase commences with growing oxide bumpers 20 and oxide layer 21. Oxide bumpers 20 are SiO$_2$ or glass and optically suitable for lenses. Oxide bumpers 20 and oxide layer 21 are grown on the structural layer 12 using a conventional oxidation process. The oxide grows on the exposed wall of the structural layer 12 as well as on the silicon substrate 10. The oxide bumper 20 grows both inward and outward in a curved shape since the constraints put on it from the silicon nitride layer 18 control the shape of the bumper as shown in FIG. 10. The oxidation rate will be slowest at the interface of the structural layer 12 with the silicon nitride layer 18. The oxide bumpers 20 are grown until the profile of the oxide growth is generally convex and forming a generally bowl shaped convexo-concave relationship with the structural layer 12. The oxidation rates are further controlled by the diffused concentration gradient 14 in the structural layer 12. Since the oxidation rates are slowest at the interface of the structural layer 12 and the silicon nitride 18, the oxide bumper will be thinnest at the interface of the structural layer 12 and the silicon nitride 18. The oxide bumper will be thickest in the center of the structural layer 12 since that is where the growth rate is fastest. The resulting generally bowl shaped curve will be in the form of either a partial sphere, a partial ellipse, some form of elliptic paraboloid, or some other three dimensional curve on the structural layer 12. The term "bowl shaped" as used herein is meant to include all such forms of shape. The generally round shaped oxide bumper will be in a form of either a sphere, ellipse some form of elliptic paraboloid, or some other three dimensional closed curve. the term "round shaped" as used herein is meant to include all such forms of shape. Since control of polysilicon oxidation rates is a well known process, the depth and profile of the oxide bumper 20 can be precisely controlled. Therefore, the generally bowl shape of the finished mirror 22 or the generally round shape of the lens 20, shown in FIGS. 22 and 23 respectively, can be precisely controlled. The growth and control of oxide bumpers is discussed in U.S. Pat. Nos. 4,400,866 and 4,375,643 by Bol and Keming, both titled Application of Grown Oxide Bumper Insulators to a High Speed VLSI SASMEFET, incorporated by reference herein.

Either oxide bumper 20 removal or structural layer 12 and silicon nitride 18 layer removal is the last step of the second phase. If the oxide bumper 20 is removed then the remaining silicon is a mirror 22 as shown in FIG. 11. Oxide bumpers 20 are removed using well-known, conventional techniques. If the structural layer 12 and the silicon nitride 18 layers are removed the remaining glass oxide bumpers 20 are lenses as shown in FIG. 12. Removal of the silicon nitride 18 and the structural layer 12 can be accomplished with well-know, conventional techniques. While the silicon is reflective enough to be a mirror, the reflectivity of the mirror can be changed by coating the mirror with reflective coatings such as metals.

Figure 13:
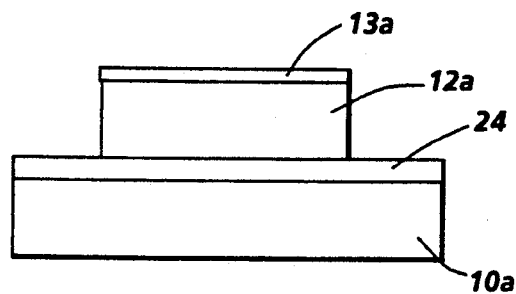
FIG. 13 is a side view of a substrate with a deposited nitride layer, a deposited and patterned structural layer, and a deposited and patterned masking layer.
Figure 14:
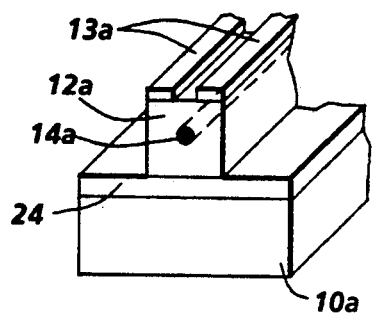
FIG. 14 is a plan view of FIG. 13 after patterning a slit in the masking layer and ion implantation.
Figure 15:
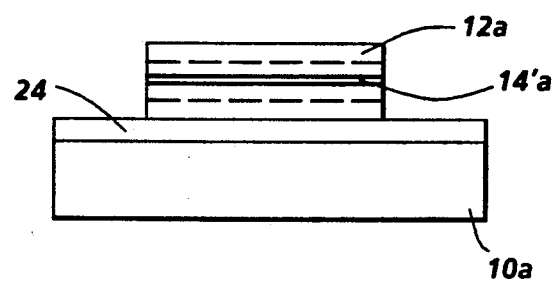
FIG. 15 is a side view of FIG. 14 after diffusion.
Figure 16:
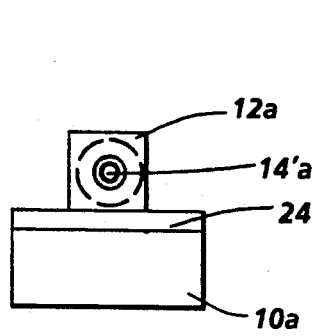
FIG. 16 is an end view of FIG. 15.
Figure 17:
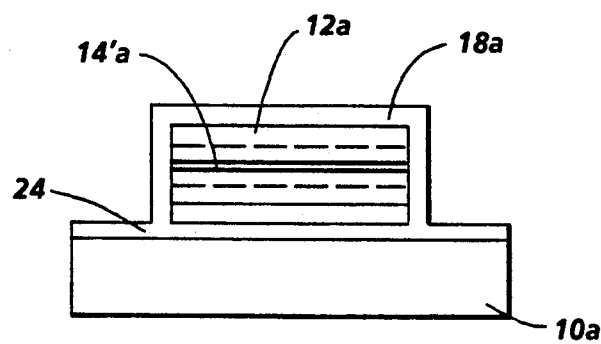
FIG. 17 is a side view of FIG. 15 after silicon nitride deposition.

A variation of the previously described process is shown in FIGS. 13–23 where elements which are the same as in the previous process are designated with the same reference numerals with and "a" affixed thereto. Referring to FIG. 13 a lens with a more uniform curve at the base 26 of the lens 20a is formed by adding, a nitride layer 24 interposed between the structural layer 12a and the substrate 10a. The nitride layer 24 is deposited before the structural layer 12a is deposited. The process steps that follow are shown in FIGS. 14–23 and are identical to the steps shown in FIGS. 3–12 resulting in a mirrors or lens of a slightly different shape. FIGS. 21–23 vary slightly in the shape of the grown oxide bumper 20a, lenses 20a, and mirrors 22a due to the addition of the nitride layer 24. The additional nitride layer controls the oxide growth at the base 26 of the oxide bumper 20a to form a more uniform curve at the base 26. Since the lenses 20a shown in FIG. 23 are isolated from the substrate 10a, it is important to leave the nitride layer 24 and a portion of the structural layer 12a to hold the lenses 20a in place.

I claim:

1. A process for making a microchemical generally bowl shaped element upon a substrate comprising:
   a. providing a member having a generally planar surface with wall means extending from said surface,
   b. growing bumper means into said wall means and forming a generally bowl shaped convexo-concave relationship with said wall means,
   c. said wall means having on its outer periphery a material which is resistant to the growing of said bumper means to control the growth of said bumper means at the periphery of said wall means as the bumper means is grown into said wall means, and
   d. removing said bumper means from said wall means and said substrate leaving a generally bowl shaped member on said substrate.

2. A process as defined in claim 1 wherein said wall means comprises silicon and the resulting generally bowl shaped element is an optical mirror.

3. A process as defined in claim 2 wherein said bumper means comprises silicon dioxide.

4. A process as defined in claim 2 wherein said material which is resistant to the growing of said bumper means comprises silicon nitride.

5. A process for making a micromechanical generally round shaped element upon a substrate comprising:
   a. providing a member having a generally planar surface with wall means extending from said surface, b. growing bumper means into said wall means and forming a generally bowl shaped convexo-concave relationship with said wall means,
c. said wall means having on its outer periphery a material which is resistant to the growing of said bumper means to control the growth of said bumper means at the periphery of said wall means as the bumper means is grown into said wall means, and
d. removing said wall means from said bumper means and said substrate leaving a generally round shaped member on said substrate.

6. A process as defined in claim 5 wherein said bumper means comprises silicon dioxide and the resulting generally round shaped element is a lens.

7. A process as defined in claim 6 wherein said wall means comprises silicon.

8. A process as defined in claim 6 wherein said material which is resistant to the growing of said bumper means comprises silicon nitride.

9. A process for making a micromechanical element upon a substrate comprising:
   a. providing a member having a generally planar surface with wall means extending from said surface,
   b. implanting dopant means into the center of said wall means,
   c. diffusing said dopant means to provide a concentration gradient means,
   d. growing bumper means into said wall means and forming a generally bowl shaped convexo-concave relationship with said wall means,
   e. said wall means having on its outer periphery a material which is resistant to the growing of said bumper means to control the growth of said bumper means at the periphery of said wall means as the bumper means is grown into said wall means, and
   f. removing said bumper means from said wall means and said substrate leaving a generally bowl shaped member on said substrate.

10. A process as defined in claim 9 wherein the resulting micromechanical element is a generally bowl shaped mirror and said wall means comprises silicon.

11. A process as defined in claim 10 wherein said material which is resistant to the growing of said bumper means comprises silicon nitride.

12. A process as defined in claim 9 wherein said dopant means comprises either arsenic, boron or phosphorus.

13. A process for making a micromechanical element upon a substrate comprising:
   a. providing a member having a generally planar surface with wall means extending from said surface,
   b. implanting dopant means into the center of said wall means,
   c. diffusing said dopant means to provide a concentration gradient means,
   d. growing bumper means into said wall means and forming a generally bowl shaped convexo-concave relationship with said wall means,
   e. said wall means having on its outer periphery a material which is resistant to the growing of said bumper means to control the growth of said bumper means at the periphery of said wall means as the bumper means is grown into said wall means, and
   f. removing said wall means from said bumper means and said substrate leaving a generally round shaped member on said substrate.

14. A process as defined in claim 13 wherein the resulting micromechanical element is a generally round shaped lens and said bumper means comprises silicon dioxide.

15. A process as defined in claim 14 wherein said material which is resistant to the growing of said bumper means comprises silicon nitride.

16. A process as defined in claim 14 wherein said dopant means comprises either arsenic, boron or phosphorus.

17. A process for making a micromechanical generally bowl shaped element upon a substrate comprising:
   a. providing a member having a generally planar surface with wall means extending from said surface,
   b. growing bumper means into said wall means and forming a generally bowl shaped convexo-concave relationship with said wall means,
   c. said wall means having on its outer periphery and interposed between said planar surface and wall means a material which is resistant to the growing of said bumper means to control the growth of said bumper means at the periphery of said wall means and between said planar surface and said wall means as the bumper means is grown into said wall means, and
   d. removing said bumper means from said wall means and said substrate leaving a generally bowl shaped member on said substrate.

18. A process as defined in claim 17 wherein said wall means comprises silicon and the resulting generally bowl shaped element is an optical mirror.

19. A process as defined in claim 18 wherein said bumper means comprises silicon dioxide.

20. A process as defined in claim 18 wherein said material which is resistant to the growing of said bumper means comprises silicon nitride.

21. A process for making a micromechanical generally round shaped element upon a substrate comprising:
   a. providing a member having a generally planar surface with wall means extending from said surface,
   b. growing bumper means into said wall means and forming a generally bowl shaped convexo-concave relationship with said wall means,
   c. said wall means having on its outer periphery and interposed between said planar surface and wall means a material which is resistant to the growing of said bumper means to control the growth of said bumper means at the periphery of said wall means and between said planar surface and said wall means as the bumper means is grown into said wall means, and
   d. removing said wall means from said bumper means and said substrate leaving a generally round shaped member on said substrate.

22. A process as defined in claim 21 wherein said bumper means comprises silicon dioxide and the resulting generally round shaped element is a lens.

23. A process as defined in claim 22 wherein said wall means comprises silicon.

24. A process as defined in claim 22 wherein said material which is resistant to the growing of said bumper means comprises silicon nitride.

25. A process for making a micromechanical element upon a substrate comprising:
   a. providing a member having a generally planar surface with wall means extending from said surface,
   b. implanting dopant means into the center of said wall means,
   c. diffusing said dopant means to provide a concentration gradient means,
   d. growing bumper means into said wall means and forming a generally bowl shaped convexo-concave relationship with said wall means,
   e. said wall means having on its outer periphery and interposed between said planar surface and wall means a material which is resistant to the growing of said bumper means to control the growth of said bumper means at the periphery of said wall means and between said planar surface and said wall means as the bumper means is grown into said wall means, and
   f. removing said bumper means from said wall means and said substrate leaving a generally bowl shaped member on said substrate.

26. A process as defined in claim 25 wherein the resulting micromechanical element is a generally bowl shaped mirror and said wall means comprises silicon.

27. A process as defined in claim 26 wherein said material which is resistant to the growing of said bumper means comprises silicon nitride.

28. A process as defined in claim 25 wherein said dopant means comprises either arsenic, boron or phosphorus.

29. A process for making a micromechanical element upon a substrate comprising:
   a. providing a member having a generally planar surface with wall means extending from said surface,
   b. implanting dopant means into the center of said wall means,
   c. diffusing said dopant means to provide a concentration gradient means,
   d. growing bumper means into said wall means and forming a generally bowl shaped convexo-concave relationship with said wall means,
   e. said wall means having on its outer periphery and interposed between said planar surface and wall means a material which is resistant to the growing of said bumper means to control the growth of said bumper means at the periphery of said wall means and between said planar surface and said wall means as the bumper means is grown into said wall means, and
   f. removing said wall means from said bumper means and said substrate leaving a generally round shaped member on said substrate.

30. A process as defined in claim 29 wherein the resulting generally round shaped micromechanical element is a lens and said bumper means comprises silicon dioxide.

31. A process as defined in claim 30 wherein said material which is resistant to the growing of said bumper means comprises silicon nitride.

32. A process as defined in claim 29 wherein said dopant means comprises either arsenic, boron or phosphorus.

* * * * *